(12) United States Patent
Matsuyama et al.

(10) Patent No.: US 9,873,025 B2
(45) Date of Patent: Jan. 23, 2018

(54) GOLF BALL

(71) Applicant: DUNLOP SPORTS CO. LTD., Kobe-shi, Hyogo (JP)

(72) Inventors: Yoshiko Matsuyama, Kobe (JP); Masatoshi Yokota, Kobe (JP); Hirokazu Okamoto, Amagasaki (JP); Kazuo Yagi, Amagasaki (JP)

(73) Assignee: DUNLOP SPORTS CO. LTD., Kobe-shi, Hyogo (JP)

( * ) Notice: Subject to any disclaimer, the term of this patent is extended or adjusted under 35 U.S.C. 154(b) by 51 days.

(21) Appl. No.: 14/875,316

(22) Filed: Oct. 5, 2015

(65) Prior Publication Data

US 2016/0096079 A1 Apr. 7, 2016

(30) Foreign Application Priority Data

Oct. 6, 2014 (JP) .................. 2014-205402

(51) Int. Cl.
*A63B 37/00* (2006.01)
*C09J 163/00* (2006.01)
*C09D 175/04* (2006.01)
*C08G 18/48* (2006.01)
*C08G 18/40* (2006.01)
*C08G 18/58* (2006.01)

(52) U.S. Cl.
CPC ...... *A63B 37/0075* (2013.01); *A63B 37/0033* (2013.01); *A63B 37/0039* (2013.01); *A63B 37/0064* (2013.01); *A63B 37/0074* (2013.01); *A63B 37/0076* (2013.01); *C08G 18/4854* (2013.01); *C09D 175/04* (2013.01); *C09J 163/00* (2013.01); *C08G 18/4045* (2013.01); *C08G 18/4054* (2013.01); *C08G 18/58* (2013.01)

(58) Field of Classification Search
None
See application file for complete search history.

(56) References Cited

U.S. PATENT DOCUMENTS

| 2006/0025241 | A1 | 2/2006 | Endo et al. |
| 2007/0148445 | A1* | 6/2007 | Licht ................ C08G 18/0823 428/355 EP |
| 2012/0021852 | A1 | 1/2012 | Isogawa |
| 2013/0296504 | A1* | 11/2013 | Sugi ........................ C09J 11/06 525/460 |

FOREIGN PATENT DOCUMENTS

| JP | 11-137725 A | 5/1999 |
| JP | 2008-34745 A | 2/2006 |
| JP | 2008-289059 A | 10/2006 |
| JP | 2012-40357 A | 3/2012 |

\* cited by examiner

*Primary Examiner* — David Buttner
(74) *Attorney, Agent, or Firm* — Birch, Stewart, Kolasch & Birch, LLP

(57) ABSTRACT

An object of the present invention is to provide a golf ball showing improved durability by improving adhesion to a constituent member comprising a polyurethane in the golf ball. The present invention provides a golf ball comprising a center and n envelope layers (n is a natural number of 1 or more) covering the center, wherein at least one envelope layer is a polyurethane envelope layer comprising a polyurethane as a principal component, and the polyurethane envelope layer and a constituent member adjacent to the polyurethane envelope layer are adhered with an adhesive resin composition, and wherein the adhesive resin composition comprises a base material including a urethane polyol and an epoxy resin, and a curing agent including a polyamine compound, and a content of the urethane polyol in the base material is 5 mass % or more and less than 40 mass %.

17 Claims, 1 Drawing Sheet

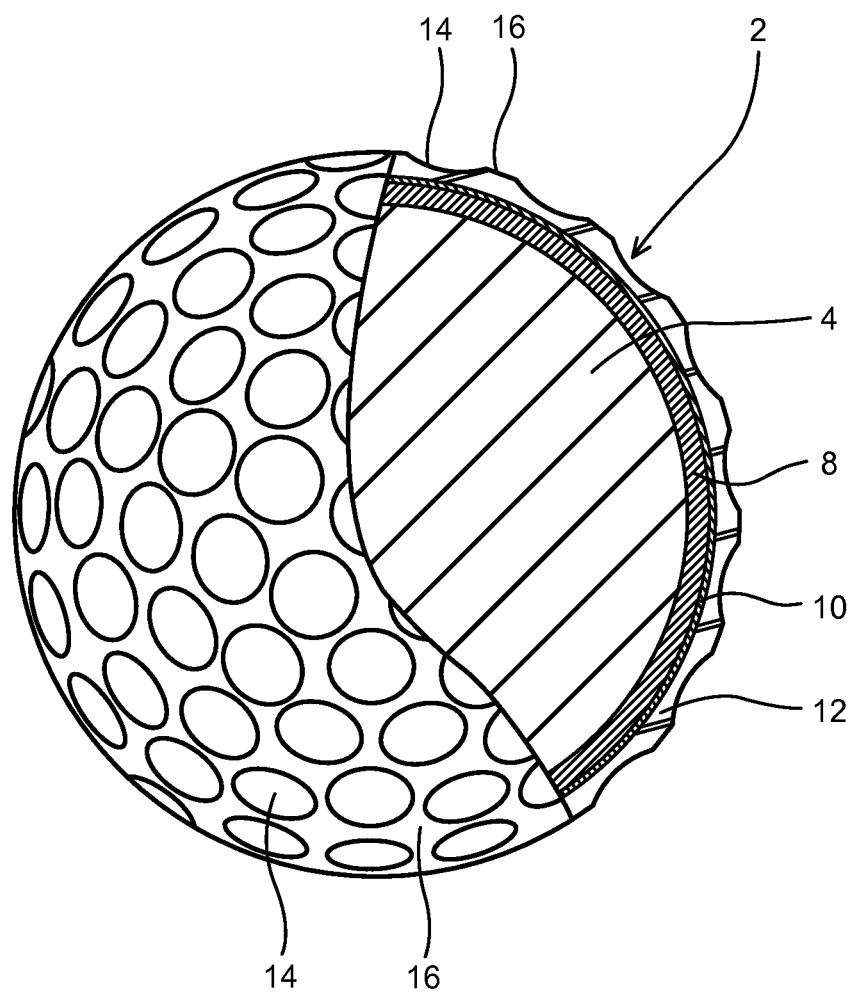

GOLF BALL

FIELD OF THE INVENTION

The present invention relates to a golf ball, and more specifically relates to a technology for improving adhesion between constituent members constituting the golf ball.

DESCRIPTION OF THE RELATED ART

A golf ball comprising a core, an intermediate layer covering the core and a cover covering the intermediate layer, wherein the intermediate layer is formed from an ionomer resin and the cover is formed from a polyurethane, is known. However, adhesion between the ionomer resin and the polyurethane is low, thus there are problems that the obtained golf ball shows lowered durability and resilience. As a technology for improving adhesion between members constituting the golf ball, for example, Japanese Patent Publications No. 2012-40357A, No. H11-137725A, No. 2006-34745A, and No. 2006-289059A can be exemplified.

Japanese Patent Publication No. 2012-40357A discloses a golf ball comprising a first layer; a second layer of which a material differs from a material of the first layer; and an adhesive layer formed from an adhesive and positioned between the first layer and the second layer, wherein a base polymer of the adhesive is a two-component curing type epoxy resin obtained by curing a bisphenol A type epoxy resin with a curing agent including a polyamine compound, and a gel fraction of the adhesive is 40% or more and 80% or less.

Japanese Patent Publication No. H11-137725A discloses a multi-piece solid golf ball comprising a solid core and a two-layered cover composed of an inner layer and an outer layer covering the solid core, wherein an adhesive layer comprising a thermoplastic resin as a primary component is formed on the inner cover, the outer cover is laminated on the adhesive layer, the inner cover comprises, as a primary component, an ionomer resin having at least 15 wt % of α,β-unsaturated carboxylic acid, and the outer cover comprises, as a primary component, a thermoplastic elastomer without containing the ionomer resin. As the adhesive, a polymer obtained by graft copolymerizing or random copolymerizing glycidyl methacrylate or an organic acid to an olefin compound, is exemplified.

Japanese Patent Publication No. 2006-34745A discloses a golf ball comprising a spherical core, an intermediate layer disposed outside of the core, a reinforcing layer disposed outside of the intermediate layer and a cover disposed outside of the reinforcing layer, wherein a principle component of a base polymer of the intermediate layer is an ionomer resin, a hardness Hm of the intermediate layer measured with a Shore D type durometer is 55 or more, a principle component of a base polymer of the cover is a thermoplastic polyurethane elastomer, a thickness Tc of the cover is 0.6 mm or less, a hardness Hc of the cover measured with a Shore D type durometer is 54 or less, and a ratio (Tr/Tc) of a thickness Tr of the reinforcing layer to the thickness Tc of the cover is 0.005 or more and 3.0 or less.

Japanese Patent Publication No. 2006-289059A discloses a golf ball comprising a spherical core, an intermediate layer disposed outside of the core, a reinforcing layer disposed outside of the intermediate layer and a cover disposed outside of the reinforcing layer, wherein a thickness Tm of the intermediate layer is 0.5 mm or more and 1.7 mm or less, a principle component of a base polymer of the cover is an ionomer resin, a hardness Hc of the cover measured with a Shore D type durometer is 56 or more and 65 or less, and a thickness Tc of the cover is 1.0 mm or less. As the base polymer of the reinforcing layer, a product obtained through a reaction between a polyurethane containing a carboxyl group and polycarbodiimide is exemplified.

SUMMARY OF THE INVENTION

It cannot be said that the technologies disclosed in Japanese Patent Publications No. 2012-40357A, No. H11-137725A, No. 2006-34745A, and No. 2006-289059A provide enough adhesion to a constituent member comprising polyurethane, and there is a problem that the golf balls show lowered durability. In particular, in case that the cover comprising polyurethane is thin, durability tends to be lowered more remarkably.

The present invention has been achieved in view of the above problems. An object of the present invention is to provide a golf ball showing improved durability by improving adhesion to a constituent member comprising a polyurethane in the golf ball. In particular, an object of the present invention is to provide a golf ball showing improved durability by improving adhesion between a constituent member comprising an ionomer resin and a constituent member comprising a polyurethane.

The present invention provides a golf ball comprising a center and n envelope layers (n is a natural number of 1 or more) covering the center, wherein at least one envelope layer is a polyurethane envelope layer comprising a polyurethane as a principal component, and the polyurethane envelope layer and a constituent member adjacent to the polyurethane envelope layer are adhered with an adhesive resin composition, and wherein the adhesive resin composition comprises a base material including a urethane polyol and an epoxy resin, and a curing agent including a polyamine compound, and a content of the urethane polyol in the base material is 5 mass % or more and less than 40 mass %.

The adhesive resin composition used in the present invention comprises a specified amount of a urethane polyol in addition to an epoxy resin. The adhesive resin composition is excellent in adhesion to a constituent member comprising a polyurethane. As a result, the obtained golf ball shows improved durability.

According to the present invention, adhesion to a constituent member comprising a polyurethane in the golf ball can be improved. As a result, a golf ball showing improved durability is obtained. Further, according to the present invention, a golf ball showing improved durability is obtained by improving adhesion between a constituent member comprising an ionomer resin and a constituent member comprising a polyurethane.

BRIEF DESCRIPTION OF THE DRAWINGS

FIG. 1 is a partially cutaway view showing a golf ball according to the preferable embodiment of the present invention.

DESCRIPTION OF THE PREFERRED EMBODIMENT

The present invention provides a golf ball comprising a center and n envelope layers (n is a natural number of 1 or more) covering the center, wherein at least one envelope layer is a polyurethane envelope layer comprising a polyurethane as a principal component, and the polyurethane envelope layer and a constituent member adjacent to the polyurethane envelope layer are adhered with an adhesive resin composition, and wherein the adhesive resin composition comprises a base material including a urethane polyol and an epoxy resin, and a curing agent including a polyamine compound, and a content of the urethane polyol in the base material is 5 mass % or more and less than 40 mass %.

Firstly, the adhesive resin composition used in the present invention will be described. The adhesive resin composition used in the present invention comprises a base material including a urethane polyol and an epoxy resin, and a curing agent including a polyamine compound, and a content of the urethane polyol in the base material is 5 mass % or more and less than 40 mass %.

The base material of the adhesive resin composition includes a urethane polyol and an epoxy resin. The urethane polyol is a compound having a plurality of urethane bonds within its molecule, and having at least two hydroxyl groups in one molecule thereof. Examples of the urethane polyol include a urethane prepolymer obtained through a reaction between a polyol component and a polyisocyanate component, under a condition that the hydroxyl groups of the polyol component is excessive to the isocyanate groups of the polyisocyanate component.

The polyisocyanate component which constitutes the urethane polyol is not particularly limited, as long as it has at least two isocyanate groups. Examples of the polyisocyanate component include an aromatic polyisocyanate such as 2,4-tolylene diisocyanate, 2,6-tolylene diisocyanate, a mixture (TDI) of 2,4-tolylene diisocyanate and 2,6-tolylene diisocyanate, 4,4'-diphenylmethane diisocyanate (MDI), 1,5-naphthylene diisocyanate (NDI), 3,3'-bitolylene-4,4'-diisocyanate (TODI), xylylene diisocyanate (XDI), tetramethylxylylenediisocyanate (TMXDI), and para-phenylene diisocyanate (PPDI); and an alicyclic polyisocyanate or aliphatic polyisocyanate such as 4,4'-dicyclohexylmethane diisocyanate ($H_{12}MDI$), hydrogenated xylylenediisocyanate ($H_6XDI$), hexamethylene diisocyanate (HDI), isophorone diisocyanate (IPDI), and norbornene diisocyanate (NBDI). These polyisocyanate components may be used alone or as a mixture of at least two of them.

Examples of the polyol component constituting the urethane polyol include a low molecular weight polyol having a molecular weight of less than 500 and a high molecular weight polyol having an average molecular weight of 500 or more. Examples of the low molecular weight polyol component include a diol such as ethylene glycol, diethylene glycol, triethylene glycol, 1,3-butanediol, 1,4-butanediol, neopentyl glycol, and 1,6-hexanediol; and a triol such as glycerin, trimethylol propane, and hexane triol. Examples of the high molecular weight polyol component include a polyether polyol such as polyoxyethylene glycol (PEG), polyoxypropylene glycol (PPG), and polyoxytetramethylene glycol (PTMG); a condensed polyester polyol such as polyethylene adipate (PEA), polybutylene adipate (PBA), and polyhexamethylene adipate (PHMA); a lactone polyester polyol such as poly-ε-caprolactone (PCL); a polycarbonate polyol such as polyhexamethylene carbonate; and an acrylic polyol. These polyol components may be used alone or as a mixture of at least two of them.

The hydroxyl value of the urethane polyol is preferably 50 mg KOH/g or more, more preferably 60 mg KOH/g or more, even more preferably 70 mg KOH/g or more, and is preferably 500 mg KOH/g or less, more preferably 450 mg KOH/g or less, even more preferably 400 mg KOH/g or less. If the hydroxyl value of the urethane polyol falls within the above range, adhesion to the golf ball's constituent member is enhanced. In the present invention, the hydroxyl value can be measured by using, for example, an acetylization method, in accordance with JIS K 1557-1.

The weight average molecular weight of the urethane polyol is preferably 200 or more, more preferably 250 or more, even more preferably 300 or more, and is preferably 50,000 or less, more preferably 45,000 or less, even more preferably 40,000 or less. If the weight average molecular weight of the urethane polyol falls within the above range, the water-resistance and impact-resistance of the adhesive layer can be enhanced. The weight average molecular weight of the urethane polyol component can be measured, for example, by gel permeation chromatography (GPC), using polystyrene as a standard material, tetrahydrofuran as an eluate, and an organic solvent system GPC column (for example, "Shodex (registered trademark) KF series" available from Showa Denko K.K.) as a column.

The content of the urethane polyol in the base material is preferably 5 mass % or more, more preferably 7 mass % or more, and is preferably less than 40 mass %, more preferably less than 35 mass %, even more preferably 20 mass % or less. If the content of the urethane polyol in the base material falls within the above range, adhesion between the polyurethane envelope layer and the adjacent layer thereto becomes better. As a result, the golf ball shows enhanced durability.

Next, the epoxy resin used in the present invention will be described. The epoxy resin is not particularly limited, as long as it is a resin having an epoxy group, and examples thereof include a novolac type epoxy resin and a bisphenol type epoxy resin.

The novolac type epoxy resin is a multifunctional epoxy resin having more than two (preferably at least three) epoxy groups within its molecule. If the novolac type epoxy resin is included, the crosslinking density of the cured product of the adhesive resin composition can be controlled. The novolac type epoxy resin is not particularly limited, and examples thereof include a phenolic novolac type epoxy resin, and an o-cresol novolac type epoxy resin.

Examples of the bisphenol type epoxy resin include a bisphenol A type epoxy resin, a bisphenol F type epoxy resin, and a bisphenol AD type epoxy resin. The bisphenol A type epoxy resin can be obtained through a reaction between bisphenol A and a compound containing an epoxy group such as epichlorohydrin. The bisphenol F type epoxy resin can be obtained by a reaction between bisphenol F and a compound containing an epoxy group. The bisphenol AD type epoxy resin can be obtained by a reaction between bisphenol AD and a compound containing an epoxy group. In light of flexibility enhancement, the base material of the adhesive resin composition used in the present invention preferably includes the bisphenol type epoxy resin, more preferably includes the bisphenol A type epoxy resin, as the epoxy resin.

The epoxy equivalent of the base material (also including a solvent or the like) is preferably 1,400 or more, more preferably 1,450 or more, even more preferably 1,500 or more, and is preferably 3,500 or less, more preferably 3,450 or less, even more preferably 3,400 or less. If the epoxy equivalent of the epoxy resin falls within the above range, the impact-resistance and abrasion-resistance of the adhesive layer can be enhanced.

The curing agent of the adhesive resin composition in the present invention includes a polyamine compound. Specific examples of the polyamine compound include a polyamide amine or a modified product thereof. The polyamide amine has a plurality of amino groups and at least one amide group.

The amino group can react with the epoxy group. The polyamide amine can be obtained through a condensation reaction between a polymerized fatty acid and a polyamine. The typical polymerized fatty acid is synthesized by heating natural fatty acids including a large amount of unsaturated fatty acids such as linoleic acid, linolenic acid and the like, in the presence of a catalyst. Specific examples of the unsaturated fatty acid include tall oil, soybean oil, linseed oil, and fish oil. A hydrogenated polymerized fatty acid including a dimer component in a content of 90 mass % or more and a trimer component in a content of 10 mass % or less, is preferred. Examples of the preferred polyamine include diethylene triamine, triethylene tetramine, isophorone diamine, xylene diamine, polyethylene diamine, polyoxyalkylene diamine, and derivatives thereof.

The adhesive resin composition can be obtained, for example, by mixing the base material including the urethane polyol, the epoxy resin and a solvent, with the curing agent including the polyamine compound and a solvent.

Examples of the preferred organic solvent include toluene, isopropyl alcohol, xylene, methyl ethyl ketone, methyl isobutyl ketone, ethylene glycol monomethyl ether, ethyl benzene, propylene glycol monomethyl ether, isobutyl alcohol, ethyl acetate. The organic solvent may be used solely, or used as a mixture of at least two organic solvents.

The adhesive resin composition preferably includes water as a volatile component. The term "volatile component" means both water and an organic solvent. The proportion Pw of the amount of water to the entire amount of the volatile component is preferably 80 mass % or more. In the adhesive resin composition in which the proportion Pw is 80 mass % or more, the gel fraction is easily controlled. In this respect, the proportion Pw is more preferably 82 mass % or more, and even more preferably 85 mass % or more. The proportion Pw may be 100%. In light of the environment, the proportion Po of the amount of the organic solvent to the entire amount of the volatile component is preferably 10 mass % or less, more preferably 5 mass % or less, and even more preferably 1 mass % or less.

The adhesive resin composition preferably has a gel fraction to acetone of 40 mass % or more. In the adhesive layer formed from the adhesive resin composition having a gel fraction of 40 mass % or more, the volatile component is unlikely to remain and thus there are few bubbles included. The adhesive resin composition firmly adheres to the envelope layer. In this respect, the gel fraction is more preferably 45 mass % or more, and even more preferably 50 mass % or more.

The gel fraction of the adhesive resin composition is preferably 80 mass % or less. The adhesive resin composition having a gel fraction of 80 mass % or less sufficiently reacts with the base polymer of the envelope layer. In this respect, the gel fraction is more preferably 76 mass % or less, and even more preferably 70 mass % or less.

The adhesive layer formed from the adhesive resin composition having a gel fraction of 40 mass % or more and 80 mass % or less shows remarkable effect in the golf ball comprising a thin cover. Further, the adhesive layer formed from the adhesive resin composition having a gel fraction of 40 mass % or more and 80 mass % or less shows remarkable effect in the golf ball comprising a soft cover.

In the measurement of the gel fraction, immediately after the base material and the curing agent are mixed, the adhesive resin composition is applied to a PB-137T zinc phosphate treated steel plate. The size of the steel plate is "150 mm×70 mm". The thickness of the steel plate is 0.8 mm. The steel plate is kept in an environment of 40° C. for 24 hours to form a coating film formed from the adhesive resin composition. A test piece is obtained from the steel plate and the coating film. The mass of the test piece is measured, and the mass M1 of the coating film is calculated by subtracting the mass of the steel plate from the measurement value. The test piece is immersed in acetone and allowed to stand for 24 hours. The test piece is kept in an environment of 105° C. for one hour. The test piece is cooled to 23° C. The mass of the test piece is measured, and the mass M2 of the coating film is calculated by subtracting the mass of the steel plate from the measurement value. The gel fraction G is calculated by the following mathematical formula.

$$G=(M2/M1)\times 100$$

The equivalent ratio (epoxy group/amino group) of the epoxy group in the base material to the amino group in the curing agent is preferably 0.5/1.0 or more and 2.0/1.0 or less. In the adhesive resin composition in which the equivalent ratio is 0.5/1.0 or more, the gel fraction is not too low. Therefore, the adhesive resin composition firmly adheres to the envelope layer. In this respect, the equivalent ratio is more preferably 0.6/1.0 or more, and even more preferably 0.7/1.0 or more. In the adhesive resin composition in which the equivalent ratio is 2.0/1.0 or less, the gel fraction is not too high. Therefore, the adhesive resin composition firmly adheres to the envelope layer. In this respect, the equivalent ratio is more preferably 1.9/1.0 or less, and even more preferably 1.8/1.0 or less.

The amine active hydrogen equivalent of the curing agent is preferably 100 g/eq or more and 800 g/eq or less. In the adhesive resin composition in which the amine active hydrogen equivalent is 100 g/eq or more, the gel fraction is not too high. Therefore, the adhesive resin composition firmly adheres to the envelope layer. In this respect, the amine active hydrogen equivalent is more preferably 200 g/eq or more, and even more preferably 300 g/eq or more. In the adhesive resin composition in which the amine active hydrogen equivalent is 800 g/eq or less, the gel fraction is not too low. Therefore, the adhesive resin composition firmly adheres to the constituent member of the golf ball. In this respect, the amine active hydrogen equivalent is more preferably 600 g/eq or less, and even more preferably 500 g/eq or less.

The adhesive resin composition used in the present invention may further include additives such as a coloring agent (typically titanium dioxide), an antioxidant, a light stabilizer, a fluorescent brightener, an ultraviolet absorber, an antiblocking agent and the like. The additives may be added into the base material or the curing agent.

The adhesive layer can be obtained by applying a liquid in which the adhesive resin components are dissolved or dispersed in a solvent, to the surface of the constituent member. In light of workability, the application using a spray gun is preferred. After the application, the solvent is volatilized to form the adhesive layer.

The thickness of the adhesive layer is preferably 3 μm or more, and more preferably 5 μm or more. In light of easily forming the adhesive layer, the thickness is preferably 300 μm or less, more preferably 100 μm or less, more preferably 50 μm or less, and even more preferably 20 μm or less. The thickness is measured by observing a cross-section of the golf ball with a microscope. When the constituent member has concavities and convexities on its surface from surface roughening, the thickness is measured at right above the convex part.

The golf ball according to the present invention comprises a center and n envelope layers (n is a natural number of 1 or more) covering the center, wherein at least one envelope layer is a polyurethane envelope layer comprising a polyurethane as a principal component, and the polyurethane envelope layer and a constituent member adjacent to the polyurethane envelope layer are adhered with the above-described adhesive resin composition. It is noted that the constituent member of the golf ball means the center or the envelope layer.

The golf ball according to the present invention comprises a center and n envelope layers covering the center. When the layers in an order starting from the center are called a first envelope layer, a second envelope layer, . . . nth envelope layer, the nth envelope layer is an outmost layer and thus corresponds to a cover. The n is not particularly limited as long as it is a natural number of 1 or more, and it is more preferred that n is a natural number of 1 or more and 4 or less. Sometimes, the layers in an order starting from the first envelope layer to the nth envelope layer are called an outer core, intermediate layer, inner cover and cover, depending on the construction of the golf ball. Specific examples of the golf ball according to the present invention include a two-piece golf ball (n=1), a three-piece golf ball (n=2), a four-piece golf ball (n=3), a five-piece golf ball (n=4), and a six-piece golf ball (n=5).

FIG. 1 is a partially cutaway view showing a golf ball 2 according to the preferable embodiment of the present invention. The golf ball 2 comprises a spherical center 4, an intermediate layer 8 covering the spherical center 4, and a cover 12 covering the intermediate layer 8, wherein the intermediate layer 8 and the cover 12 are adhered with an adhesive resin composition 10. Plurality of dimples 14 are formed on a surface of the cover 12. Other portions than dimples 14 on the surface of the golf ball 2 are land 16. The golf ball 2 is provided with a paint layer and a mark layer outside the cover 12, but these layers are not depicted.

In the golf ball according to the present invention, at least one envelope layer is a polyurethane envelope layer comprising a polyurethane as a principal component, and the polyurethane envelope layer and a constituent member adjacent to the polyurethane envelope layer are adhered with the above-described adhesive resin composition. The adhesion strength between the polyurethane envelope layer and the constituent member adjacent to the polyurethane envelope layer is preferably 8 N or more, and more preferably 12 N or more. If the adhesion strength falls within the above range, the polyurethane envelope layer and the constituent member adjacent to the polyurethane envelope layer firmly adhere each other, and thus durability of the golf ball improves.

The adhesive resin composition used in the present invention can be suitably employed to improve adhesion between a layer comprising an ionomer resin and a polyurethane envelope layer in the golf ball. In other words, it is preferred that the golf ball according to the present invention comprises a layer comprising an ionomer resin and a polyurethane envelope layer, and the layer comprising the ionomer resin and the polyurethane envelope layer are adhered with the above-described adhesive resin composition.

Next, specific embodiments according to the present invention will be described. Here, the layers starting from the first envelope layer to the n−1th envelope layer are called an intermediate layer, the outmost envelope layer (the nth envelope layer) is called a cover. Specific examples of the golf ball according to the present invention include an embodiment which is a two-piece golf ball comprising a center and a cover covering the center, and in which the center comprises an ionomer resin, the cover comprises a polyurethane, and the center and the cover are adhered with the adhesive resin composition; an embodiment which is a three-piece golf ball comprising a center, an intermediate layer covering the center, and a cover covering the intermediate layer, and in which the intermediate layer comprises an ionomer resin, the cover comprises a polyurethane, and the intermediate layer and the cover are adhered with the adhesive resin composition; an embodiment which is a multi-piece golf ball comprising a center, two or more intermediate layers covering the center, and a cover covering the intermediate layers, and in which among two adjacent intermediate layers, one intermediate layer comprises an ionomer resin, another intermediate layer comprises a polyurethane, and one intermediate layer and another intermediate layer are adhered with the adhesive resin composition; and an embodiment which is a multi-piece golf ball comprising a center, two or more intermediate layers covering the center, and a cover covering the intermediate layers, and in which the outmost intermediate layer comprises an ionomer resin, the cover comprises a polyurethane, and the outmost intermediate layer and the cover are adhered with the adhesive resin composition.

The content of the polyurethane in the resin component of the polyurethane envelope layer is preferably 50 mass % or more, more preferably 60 mass % or more, even more preferably 70 mass % or more, and most preferably 90 mass % or more.

The polyurethane which can be used in the polyurethane envelope layer is a polymer having a plurality of urethane bonds within its molecular chain, and for example, can be obtained through a reaction between a polyol and a polyisocyanate. A chain extension reaction may be further carried out with a chain extender such as a low molecular weight polyol, a low molecular weight polyamine and the like, where necessary.

The polyisocyanate component constituting the polyurethane is not particularly limited, as long as it has at least two isocyanate groups. Examples of the polyisocyanate component include one kind selected from an aromatic polyisocyanate such as 2,4-tolylene diisocyanate, 2,6-tolylene diisocyanate, a mixture (TDI) of 2,4-tolylene diisocyanate and 2,6-tolylene diisocyanate, 4,4'-diphenylmethane diisocyanate (MDI), 1,5-naphthylene diisocyanate (NDI), 3,3'-bitolylene-4,4'-diisocyanate (TODI), xylylene diisocyanate (XDI), tetramethylxylylene diisocyanate (TMXDI), and para-phenylene diisocyanate (PPDI); and an alicyclic polyisocyanate or aliphatic polyisocyanate such as 4,4'-dicyclohexylmethane diisocyanate ($H_{12}$MDI), hydrogenated xylylenediisocyanate ($H_6$XDI), hexamethylene diisocyanate (HDI), isophorone diisocyanate (IPDI), and norbornene diisocyanate (NBDI); and a mixture of at least two of these polyisocyanates.

When the cover comprises a polyurethane, in light of improving abrasion resistance, the aromatic polyisocyanate is preferably used as the polyisocyanate component of the polyurethane. If the aromatic polyisocyanate is used, the resultant polyurethane exhibits enhanced mechanical properties, and thus the cover showing excellent abrasion resistance can be obtained. In addition, in light of improving weather resistance, as the polyisocyanate component of the polyurethane, a non-yellowing type polyisocyanate (e.g. TMXDI, XDI, HDI, $H_6$XDI, IPDI, $H_{12}$MDI, NBDI, and the like) is preferably used, and 4,4'-dicyclohexylmethane diisocyanate ($H_{12}$MDI) is more preferably used. 4,4'-dicyclohexylmethane diisocyanate ($H_{12}$MDI) has a rigid structure, the resultant polyurethane exhibits enhanced mechanical properties, and thus the cover showing excellent abrasion resistance can be obtained.

The polyol component constituting the polyurethane is not particularly limited as long as it has a plurality of hydroxyl groups, and examples thereof include a low molecular weight polyol used as a chain extender, and a polymer polyol constituting a soft segment. Examples of the low molecular weight polyol include a diol such as ethylene glycol, diethylene glycol, triethylene glycol, 1,3-butanediol, 1,4-butanediol, neopentyl glycol, and 1,6-hexanediol; and a triol such as glycerin, trimethylol propane, and hexane triol. Examples of the polymer polyol include a polyether polyol such as polyoxyethylene glycol (PEG), polyoxypropylene glycol (PPG), and polyoxytetramethylene glycol (PTMG); a condensed polyester polyol such as polyethylene adipate (PEA), polybutylene adipate (PBA), and polyhexamethylene adipate (PHMA); a lactone polyester polyol such as poly-ε-caprolactone (PCL); a polycarbonate polyol such as polyhexamethylene carbonate; and an acrylic polyol. These polyols can be used as a mixture of at least two of them. When the cover comprises a polyurethane, it is preferred that the polyol component constituting the polyurethane is polyoxytetramethylene glycol.

The number average molecular weight of the polymer polyol is not particularly limited, and for example, is preferably 400 or more, and more preferably 1,000 or more. If the number average molecular weight of the polymer polyol is too small, the resultant polyurethane is hard, and thus the golf ball tends to show lowered shot feeling. The upper limit of the number average molecular weight of the polymer polyol is not particularly limited, and is preferably 10,000 or less, and more preferably 8,000 or less.

The polyamine which can constitute the polyurethane where necessary is not particularly limited, as long as it has at least two amino groups. Examples of the polyamine include an aliphatic polyamine such as ethylene diamine, propylene diamine, butylene diamine, and hexamethylene diamine; an alicyclic polyamine such as isophorone diamine, and piperazine; and an aromatic polyamine such as phenylene diamine, tolylene diamine, diethyltoluene diamine, dimethylthiotoluene diamine, xylylene diamine, and diphenylmethane diamine.

The slab hardness of the polyurethane is preferably 5 or more, more preferably 10 or more, and even more preferably 15 or more in Shore D hardness. If the slab hardness of the polyurethane is 5 or more in Shore D hardness, the shape of the resultant constituent member can be maintained. The slab hardness of the polyurethane is preferably 60 or less, more preferably 55 or less, and even more preferably 50 or less in Shore D hardness. If the slab hardness of the polyurethane is 60 or less in Shore D hardness, the obtained golf ball shows better shot feeling.

Specific examples of the polyurethane include "Elastollan NY85A", "Elastollan NY90A", "Elastollan NY97A", "Elastollan NY585", and the like commercially available from BASF Japan Ltd.; and "Resamine P4585LS", "Resamine PS62490", and the like commercially available from Dainichiseika Color & Chemicals Mfg. Co., Ltd.

Examples of the ionomer resin which can be used in the envelope layer of the golf ball according to the present invention, include a product prepared by neutralizing at least a part of carboxyl groups in a binary copolymer composed of an olefin and an α,β-unsaturated carboxylic acid having 3 to 8 carbon atoms with a metal ion; a product prepared by neutralizing at least a part of carboxyl groups in a ternary copolymer composed of an olefin, an α,β-unsaturated carboxylic acid having 3 to 8 carbon atoms and an α,β-unsaturated carboxylic acid ester with a metal ion; and a mixture of them. The olefin preferably includes an olefin having 2 to 8 carbon atoms, and examples thereof include ethylene, propylene, butene, pentene, hexene, heptene, and octane, and ethylene is particularly preferred. Examples of the α,β-unsaturated carboxylic acid having 3 to 8 carbon atoms include acrylic acid, methacrylic acid, fumaric acid, maleic acid and crotonic acid, and acrylic acid and methacrylic acid are particularly preferred. Examples of the α,β-unsaturated carboxylic acid ester include methyl ester, ethyl ester, propyl ester, n-butyl ester, isobutyl ester of acrylic acid, methacrylic acid, fumaric acid and maleic acid, and acrylic acid ester and methacrylic acid ester are particularly preferred. Among them, as the ionomer resin, a metal ion-neutralized product of a binary copolymer composed of ethylene and (meth)acrylic acid, and a metal ion-neutralized product of a ternary copolymer composed of ethylene-(meth)acrylic acid-(meth)acrylic acid ester are preferred.

Specific examples of the ionomer resin include trade name "Himilan (registered trademark) (e.g. Himilan 1555 (Na), Himilan 1557 (Zn), Himilan 1605 (Na), Himilan 1706 (Zn), Himilan 1707 (Na), and Himilan AM7311 (Mg); Himilan 1856 (Na) and Himilan 1855 (Zn) which are ternary copolymer ionomer resins)" commercially available from Du Pont-Mitsui Polychemicals Co., Ltd.

Further, examples of the ionomer resin include "Surlyn (registered trademark) (e.g. Surlyn 8945 (Na), Surlyn 9945 (Zn), Surlyn 8140 (Na), Surlyn 8150 (Na), Surlyn 9120 (Zn), Surlyn 9150 (Zn), Surlyn 6910 (Mg), Surlyn 6120 (Mg), Surlyn 7930 (Li), Surlyn 7940 (Li), and Surlyn AD8546 (Li); Surlyn 8120 (Na), Surlyn 8320 (Na), Surlyn 9320 (Zn), Surlyn 6320 (Mg), HPF 1000 (Mg) and HPF 2000 (Mg) which are ternary copolymer ionomer resins)" commercially available from E.I. du Pont de Nemours and Company.

Further, examples of the ionomer resin include "Iotek (registered trademark) (e.g. Iotek 8000 (Na), Iotek 8030 (Na), Iotek 7010 (Zn), and Iotek 7030 (Zn); Iotek 7510 (Zn) and Iotek 7520 (Zn) which are ternary copolymer ionomer resins)" commercially available from ExxonMobil Chemical Corporation.

It is noted that Na, Zn, Li, Mg or the like described in the parentheses after the trade name of the ionomer resin indicates the metal type of the neutralizing metal ion. The ionomer resin may be used solely, or as a mixture of two or more of them.

The constituent member of the golf ball according to the present invention may comprise another resin component, as long as another resin component does not impair the effect of the present invention. Examples of another resin component include a thermoplastic polyamide elastomer, a thermoplastic polyester elastomer, and a thermoplastic styrene elastomer.

In the golf ball according to the present invention, the thickness of each layer starting from the first envelope layer to the n−1th envelope layer is not particularly limited, and is preferably 0.5 mm or more, more preferably 1 mm or more, even more preferably 1.2 mm or more, and is preferably 10 mm or less, more preferably 8 mm or less, even more preferably 5 mm or less.

The thickness of the nth envelope layer (outmost layer) is preferably 3.0 mm or less, more preferably 2.7 mm or less, even more preferably 2.4 mm or less, and particularly preferably 2.0 mm or less. If the thickness of the nth envelope layer (outmost layer) is 3.0 mm or less, the obtained golf ball shows better resilience and shot feeling. The thickness of the nth envelope layer (outmost layer) is preferably 0.3 mm or more, and more preferably 0.5 mm or more. If the thickness of the nth envelope layer (outmost layer) is less than 0.3 mm, the nth envelope layer (outmost layer) is difficult to be formed, and durability and abrasion resistance of the nth envelope layer (outmost layer) tend to be lowered.

The center of the golf ball according to the present invention preferably employs a conventionally known rubber composition (hereinafter, sometimes simply referred to as "center rubber composition"). The center can be molded by, for example, heat pressing a rubber composition comprising a base rubber, a co-crosslinking agent, and a crosslinking initiator.

As the base rubber, particularly preferred is a high cis-polybutadiene having cis-bond in a proportion of 40 mass % or more, more preferably 70 mass % or more, and even more preferably 90 mass % or more in view of its advantageous resilience property. As the co-crosslinking agent, an $\alpha,\beta$-unsaturated carboxylic acid having 3 to 8 carbon atoms or a metal salt thereof is preferred, and a metal salt of acrylic acid or a metal salt of methacrylic acid is more preferred. As the metal constituting the metal salt, zinc, magnesium, calcium, aluminum or sodium is preferred, and zinc is more preferred. The amount of the co-crosslinking agent to be used is preferably 20 parts by mass or more and 50 parts by mass or less with respect to 100 parts by mass of the base rubber. The crosslinking initiator is blended to crosslink the base rubber component. As the crosslinking initiator, an organic peroxide is preferably used. Examples of the organic peroxide include dicumyl peroxide, 1,1-bis(t-butylperoxy)-3,3,5-trimethylcyclohexane, 2,5-dimethyl-2,5-di(t-butylperoxy)hexane, and di-t-butyl peroxide. Among them, dicumyl peroxide is preferably used. The amount of the crosslinking initiator to be used is preferably 0.2 part by mass or more, more preferably 0.3 part by mass or more, and is preferably 3 parts by mass or less, more preferably 2 parts by mass or less, with respect to 100 parts by mass of the base rubber. Further, the center rubber composition may comprises an organic sulfur compound. As the organic sulfur compound, diphenyl disulfide or a derivative thereof, and thiophenol or a derivative thereof can be preferably used. The amount of the organic sulfur compound to be used is preferably 0.1 part by mass or more, more preferably 0.3 part by mass or more, and is preferably 5.0 parts by mass or less, more preferably 3.0 parts by mass or less, with respect to 100 parts by mass of the base rubber.

In the center rubber composition, a weight adjusting agent such as zinc oxide and barium sulfate, an antioxidant, a coloring powder, or the like may be further blended appropriately, in addition to the base rubber, the co-crosslinking agent, the crosslinking initiator, and the organic sulfur compound. The molding conditions for heat pressing the center rubber composition may be determined appropriately depending on the rubber composition. Conventionally, heating at a temperature ranging from 130° C. to 200° C. for 10 to 60 minutes is preferred. Alternatively, a two-step heating in which heating at a temperature ranging from 130° C. to 150° C. for 20 to 40 minutes is carried out, and then heating at a temperature ranging from 160° C. to 180° C. for 5 to 15 minutes is carried out, is preferred. The center preferably has a spherical shape.

The diameter of the spherical center is preferably 15 mm or more, more preferably 20 mm or more, even more preferably 30 mm or more, and is preferably 41 mm or less, more preferably 40 mm or less, even more preferably 39 mm or less. If the center has a diameter falling within the above range, shot feeling and resilience thereof are better.

When the golf ball according to the present invention has a diameter ranging from 40 mm to 45 mm, the compression deformation amount (shrinking amount along the compression direction) of the golf ball when applying a load from 98 N as an initial load to 1275 N as a final load to the golf ball is preferably 2.0 mm or more, more preferably 2.2 mm or more, and is preferably 4.0 mm or less, more preferably 3.5 mm or less. If the golf ball has a compression deformation amount of 2.0 mm or more, the golf ball is not too hard and thus shot feeling thereof is better. On the other hand, if the golf ball has a compression deformation amount of 4.0 mm or less, the resilience thereof is better.

EXAMPLES

Next, the present invention will be described in detail by way of examples, however, the present invention is not limited to the examples described below. Various changes and modifications without departing from the spirit and scope of the present invention are included in the present invention.

[Evaluation Method]
(1) Slab Hardness (Shore D Hardness)

A sheet with a thickness of about 2 mm was produced by injection molding the envelope layer composition, and stored at 23° C. for two weeks. Three or more of these sheets were stacked on one another so as not to be affected by the measuring substrate on which the sheets were placed, and the hardness of the stack was measured with a type P1 auto loading durometer manufactured by Kobunshi Keiki Co., Ltd., provided with a Shore D type spring hardness tester prescribed in ASTM-D2240.

(2) Durability

A metal-headed W#1 driver (trade name: "XXIO", shaft hardness: S, loft angel: 11°, manufactured by Dunlop Sports Limited) was installed on a swing robot M/C manufactured by True Temper Sports, Inc., and the head speed was set to 45 m/s. The golf balls were stored at 23° C. for 12 hours in a thermostatic chamber. Each golf ball was hit immediately after taken from the thermostatic chamber, and the hitting number required to break the golf ball was counted. Twelve samples were employed for the measurement of each golf ball. A greater number indicates that durability of the golf ball is excellent.

(3) Adhesion Strength

Test method A: a test piece including the intermediate layer and the cover was cut out from the golf ball. The size of the test piece was "10 mm×50 mm". At an end of the test piece, the intermediate layer was peeled from the cover. The intermediate layer was fixed to a first chuck, and the cover was fixed to a second chuck. The second chuck was allowed to move relatively to the first chuck to peel the cover from the intermediate layer. The force applied at the peeling was measured. "Autograph AG-IS" manufactured by Shimadzu Corporation was used for the measurement. The tensile rate was 50 mm/min.

(4) Compression Deformation Amount (mm)

The compression deformation amount of the golf ball along the compression direction (shrinking amount of the golf ball along the compression direction), when applying a load from 98 N as an initial load to 1275 N as a final load to the golf ball, was measured.

[Production of Golf Ball]

(1) Production of Center

The rubber composition having the formulation shown in Table 1 was kneaded, and heat-pressed in upper and lower molds, each having a hemispherical cavity, at 170° C. for 15 minutes to obtain the spherical core having a diameter of 39.7 mm.

TABLE 1

| Rubber composition | Formulation (parts by mass) |
|---|---|
| Polybutadiene rubber | 100 |
| Zinc acrylate | 33 |
| Zinc oxide | 5 |
| Barium sulfate | Appropriate amount *) |
| Diphenyl disulfide | 0.5 |
| Dicumyl peroxide | 0.8 |
| Center diameter (mm) | 39.7 |
| Center hardness (JIS-C) | 65.0 |
| Surface hardness (JIS-C) | 83.0 |

*) The amount of barium sulfate was adjusted such that the finally obtained golf ball had a mass of 45.4 g.
Polybutadiene rubber: "BR730 (high-cis polybutadiene, cis-1,4 bond content = 96 mass %, 1,2-vinyl bond content = 1.3 mass %, Moony viscosity ($ML_{1+4}$ (100° C.) = 55, molecular weight distribution (Mw/Mn) = 3)" manufactured by JSR Corporation
Zinc acrylate: "ZNDA-90S" manufactured by Nihon Jyoryu Kogyo Co., Ltd.
Zinc oxide: "Ginrei (registered trademark) R" manufactured by Toho Zinc Co., Ltd.
Barium sulfate: "Barium Sulfate BD" manufactured by Sakai Chemical Industry Co., Ltd.
Dicumyl peroxide: "Percumyl (registered trademark) D" manufactured by NOF Corporation
Diphenyl disulfide: manufactured by Sumitomo Seika Chemicals Co., Ltd.

(2) Preparation of Envelope Layer Composition

The materials having the formulation shown in Table 2 were mixed with a twin-screw kneading extruder to prepare the envelope layer composition in a pellet form. The envelope layer composition No. 1 comprising an ionomer resin was used for the intermediate layer, and the envelope layer composition No. 2 comprising a polyurethane was used for the cover. The extrusion of the envelope layer composition No. 1 (intermediate layer composition) was conducted in the following conditions: screw diameter=45 mm, screw revolution=200 rpm, screw L/D=35, and cylinder temperature=140° C. to 200° C. The extrusion of the envelope layer composition No. 2 (cover composition) was conducted in the following conditions: screw diameter=45 mm, screw revolution=200 rpm, and screw L/D=35, and the blended materials were heated to 160° C. to 230° C. at the die position of the extruder.

TABLE 2

| Envelope layer composition | No. 1 | No. 2 |
|---|---|---|
| Surlyn 8945 | 55 | — |
| Himilan AM7329 | 45 | — |
| Elastollan NY85A | — | 100 |
| Titanium dioxide | 3 | 3 |
| Ultramarine blue | — | 0.04 |
| Slab hardness (Shore D) | 65 | 32 |

Formulation: parts by mass
Himilan AM7329: Zinc ion-neutralized ethylene-methacrylic acid copolymer ionomer resin manufactured by Mitsui-Du Pont Polychemicals Co., Ltd.
Surlyn 8945: Sodium ion-neutralized ethylene-methacrylic acid copolymer ionomer resin manufactured by E. I. du Pont de Nemours and Company
Elastollan NY85A: Polyurethane elastomer manufactured by BASF Japan Ltd.

(3) Production of Golf Ball Body

The envelope layer composition No. 1 obtained in (2) was injected molded onto the center obtained in (1) to form the intermediate layer (thickness: 1.0 mm) covering the center.

(4) Production of Adhesive Layer

The adhesive resin composition shown in Table 3 was prepared. The obtained adhesive resin composition was applied to the surface of the intermediate layer using a spray gun, and kept for 12 hours in an atmosphere of 23° C. to form the adhesive layer (thickness: 0.003 mm). In addition, the golf ball No. 12 was produced without using the adhesive resin composition.

TABLE 3

| | Golf ball No. | 1 | 2 | 3 | 4 | 5 | 6 | 7 | 8 | 9 | 10 | 11 | 12 |
|---|---|---|---|---|---|---|---|---|---|---|---|---|---|
| Base material (parts by mass) | Bisphenol A type epoxy resin 1 | 32 | 29 | 29 | 24 | 18 | 14 | 9 | 34 | 32 | 9 | — | — |
| | Bisphenol A type epoxy resin 2 | — | — | — | — | — | — | — | — | — | — | 30 | — |
| | Urethane polyol | 5 | 7 | 9 | 12 | 19 | 26 | 39 | — | 4 | 42 | — | — |
| | Solvent | 6 | 10 | 5 | 4 | 3 | 3 | 3 | 6 | 6 | 3 | 70 | — |
| | Water | 57 | 54 | 57 | 60 | 60 | 57 | 49 | 60 | 58 | 46 | — | — |
| | Total | 100 | 100 | 100 | 100 | 100 | 100 | 100 | 100 | 100 | 100 | 100 | |
| | Epoxy equivalent (g/eq) | 1594 | 1759 | 1759 | 2125 | 2833 | 3643 | 5667 | 1500 | 1594 | 5667 | 1633 | — |
| | OH value (mg KOH/g) | 18 | 26 | 34 | 45 | 71 | 96 | 144 | — | 15 | 155 | — | — |
| Curing agent (parts by mass) | Modified polyamide amine 1 | 23 | 23 | 23 | 23 | 23 | 23 | 23 | 23 | 23 | 23 | — | — |
| | Modified polyamide amine 2 | — | — | — | — | — | — | — | — | — | — | 40 | — |
| | Solvent | 1 | 1 | 1 | 1 | 1 | 1 | 1 | — | 1 | 1 | 55 | — |
| | Water | 56 | 56 | 56 | 56 | 56 | 56 | 56 | 56 | 56 | 56 | — | — |
| | Titanium dioxide | 20 | 20 | 20 | 20 | 20 | 20 | 20 | 20 | 20 | 20 | 5 | — |
| | Total | 100 | 100 | 100 | 100 | 100 | 100 | 100 | 99 | 100 | 100 | 100 | |
| | Active hydrogen equivalent (g/eq) | 348 | 348 | 348 | 348 | 348 | 348 | 348 | 348 | 348 | 348 | 1345 | — |
| Mixing | Water content | 91.8 | 86.5 | 92.9 | 94.3 | 95.5 | 95.3 | 94.5 | 92.2 | 91.9 | 93.9 | 0 | — |
| | Organic solvent content | 8.2 | 13.5 | 7.1 | 5.7 | 4.5 | 4.7 | 5.5 | 7.8 | 8.1 | 6.1 | 100 | — |
| | Epoxy equivalent/active hydrogen equivalent | 1.0 | 1.0 | 1.0 | 1.0 | 1.0 | 1.0 | 1.0 | 0.9 | 1.0 | 1.0 | 1.2 | — |
| | Base material/curing agent (mass ratio) | 4.6/1.0 | 5.0/1.0 | 5.0/1.0 | 6.0/1.0 | 8.0/1.0 | 10/1 | 16/1 | 4/1 | 4.6/1 | 16/1 | 1/1 | — |
| | Gel fraction (%) | 63 | 63 | 63 | 50 | 41 | 41 | 40 | 64 | 63 | 35 | 88 | — |

TABLE 3-continued

| | Golf ball No. | 1 | 2 | 3 | 4 | 5 | 6 | 7 | 8 | 9 | 10 | 11 | 12 |
|---|---|---|---|---|---|---|---|---|---|---|---|---|---|
| Ball evaluation results | Compression deformation amount (mm) | 2.6 | 2.6 | 2.6 | 2.6 | 2.6 | 2.6 | 2.6 | 2.6 | 2.6 | 2.6 | 2.6 | 2.6 |
| | Durability (hitting number) | 220 | 250 | 150 | 170 | 200 | 190 | 180 | 90 | 95 | 80 | 60 | 25 |
| | Adhesive strength (N) | 18 | 20 | 18 | 19 | 17 | 17 | 15 | 8 | 9 | 7 | 10 | 2 |

Bisphenol A type epoxy resin 1: Epolusion HC-116 manufactured by Nippon NSC Co. Ltd.
Bisphenol A type epoxy resin 2: epoxy resin manufactured by Shinto Paint Co., Ltd.
Urethane polyol: FLEXOREZ UD-350W manufactured by King Industries Inc.
Modified polyamide amine 1: Tohmide TXS-53-C manufactured by T&K TOKA Co., Ltd.
Modified polyamide amine 2: Tohmide TXD-628 manufactured by T&K TOKA Co., Ltd.

(5) Production of Cover (Polyurethane Envelope Layer)

The nth envelope layer (cover) was formed by compression molding the obtained envelope layer composition No. 2. Half shells were prepared by charging the obtained envelope layer composition No. 2 in a pellet form into each concave portion of the lower mold of the mold for molding the half shells, and performing compression. The compression molding was conducted at the molding temperature of 160° C. for 2 minutes under the molding pressure of 11 MPa. The spherical body on which the intermediate layer was formed was covered concentrically with two half shells. The spherical body and half shells were charged into the mold having a plurality of pimples on the cavity surface, and the cover (thickness: 0.5 mm) was molded by compression molding. The compression molding was conducted at the molding temperature of 150° C. for 3 minutes under the molding pressure of 13 MPa. After the molding, a plurality of dimples having a shape which is the reversed shape of the pimples were formed on the nth envelope layer (cover). The surface of the obtained golf ball body was treated with sandblast, marked, and painted with a clear paint. The paint was dried in an oven at 40° C. to obtain the golf ball having a diameter of 42.8 mm and a mass of 45.4 g.

Evaluation results for adhesion between the polyurethane envelope layer and the envelope layer comprising the ionomer resin are shown in Table 3. In addition, evaluation results for durability of the obtained golf ball are also shown in Table 3. It is apparent from the results of Table 3 that, the adhesion strength between the polyurethane envelope layer and the envelope layer comprising the ionomer resin is enhanced, by employing an adhesive resin composition which comprises a base material including a urethane polyol and an epoxy resin, and a curing agent including a polyamine compound, and in which a content of the urethane polyol in the base material is 5 mass % or more and less than 40 mass %. Further, it is apparent that the golf ball according to the present invention using the adhesive resin composition shows excellent durability.

The present invention is suitable for a golf ball comprising a constituent member comprising an ionomer resin and a constituent member comprising a polyurethane. This application is based on Japanese patent application No. 2014-205402 filed on Oct. 6, 2014, the content of which is hereby incorporated by reference.

The invention claimed is:

1. A golf ball comprising a center and n envelope layers covering the center,
wherein n is a natural number of one or more,
wherein at least one envelope layer is a polyurethane envelope layer comprising a polyurethane as a principal component, and the polyurethane envelope layer and a constituent member adjacent to the polyurethane envelope layer are adhered with an adhesive layer formed from an adhesive resin composition, and
wherein the adhesive resin composition comprises
a base material including a urethane polyol having a hydroxyl value ranging from 50 mg KOH/g to 500 mg KOH/g, an epoxy resin and a solvent, and
a curing agent including a polyamine compound and having an amine active hydrogen equivalent ranging from 100 g/eq to 800 g/eq, and the urethane polyol content in the base material is 5 mass % or more and less than 40 mass %.

2. The golf ball according to claim 1, wherein the epoxy resin includes a bisphenol A type epoxy resin.

3. The golf ball according to claim 1, wherein the adhesive resin composition has a gel fraction of 40 mass % or more and 80 mass % or less.

4. The golf ball according to claim 1, wherein an equivalent ratio (epoxy group/amino group) of an epoxy group in the base material to an amino group in the curing agent ranges from 0.5 to 2.0.

5. The golf ball according to claim 1, wherein the adhesive resin composition comprises a volatile component that includes the solvent, the volatile component includes water, and the water is present in a content of 80 mass % or more based on the entire amount of the volatile component.

6. The golf ball according to claim 1, wherein the content of the urethane polyol in the base material is 7 mass % or more and 30 mass % less.

7. The golf ball according to claim 1, wherein an adhesion strength between the polyurethane envelope layer and the constituent member adjacent to the polyurethane envelope layer is 8 N or more.

8. The golf ball according to claim 1, wherein the urethane polyol has a weight average molecular weight ranging from 200 to 50,000.

9. The golf ball according to claim 1, wherein the base material has an epoxy equivalent ranging from 1,400 to 3,500.

10. The golf ball according to claim 1, wherein the polyamine compound is at least one selected from the group consisting of diethylene triamine, triethylene tetramine, isophorone diamine, xylene diamine, polyethylene diamine, polyoxyalkylene diamine, and derivatives thereof.

11. The golf ball according to claim 1, wherein an adhesive layer formed from the adhesive resin composition has a thickness ranging from 3 μm to 300 μm.

12. The golf ball according to claim 1, wherein the constituent member adjacent to the polyurethane envelope layer is a layer comprising an ionomer resin.

13. The golf ball according to claim 1, wherein the polyurethane has a slab hardness ranging from 5 to 60 in Shore D hardness.

14. The golf ball according to claim 1, wherein the nth envelope layer (outmost layer) has a thickness ranging from to 0.3 mm to 3.0 mm.

15. The golf ball according to claim 1, wherein the center has a diameter ranging from 15 mm to 41 mm.

16. The golf ball according to claim 1, wherein
   the golf ball is a three-piece golf ball comprising a center and two envelope layers,
   the first envelope layer (intermediate layer) comprises an ionomer resin, and the second envelope layer (cover) is the polyurethane envelope layer, and
   the first envelope layer and the second envelope layer are adhered with the adhesive resin composition.

17. The golf ball according to claim 16, wherein the center is formed from a rubber composition comprising a base rubber, a co-crosslinking agent, and a crosslinking initiator.

\* \* \* \* \*